United States Patent [19]

Stoutamire

[11] Patent Number: 6,018,628
[45] Date of Patent: Jan. 25, 2000

[54] METHOD OF IMPLEMENTING PARAMETERIZED TYPES TO BE COMPATIBLE WITH EXISTING UNPARAMETERIZED LIBRARIES

[75] Inventor: David P. Stoutamire, San Juan Bautista, Calif.

[73] Assignee: Sun Microsystems, Inc., Palo Alto, Calif.

[21] Appl. No.: 09/098,126

[22] Filed: Jun. 16, 1998

[51] Int. Cl.[7] .................................................. G06F 9/45
[52] U.S. Cl. ......................... 395/705; 395/710; 709/305
[58] Field of Search .................................. 395/701, 702, 395/705, 706, 708, 710; 707/101–104; 709/303–304, 300, 305

[56] References Cited

U.S. PATENT DOCUMENTS

| 5,339,434 | 8/1994 | Rusis ........................................ 709/246 |
| 5,896,522 | 4/1999 | Ward et al. ............................. 395/707 |

OTHER PUBLICATIONS

Thorup, K., "Genericity in Java with Virtual Types", in Aksit and Matsuoka, eds., Proceedings of ECOOP '97, Jyvaskyla, Finland, published at least by Jun., 1997.

Bracha, G., Odersky, M. Stoutamire, D., and Wadler, P., "GJ Specification", published at least by Apr., 1998.

Bracha, G., Odersky M., Stoutamire, D., and Wadler, P., "GJ: Extending the Java™ Programming Language with Type Parameters", published at least by Apr., 1998.

Bracha, G., Odersky, M., Stoutamire, D., Wadler, P., "Generic Java: Java with Type Parameters", published at least by Apr., 1998.

Bracha, G., Odersky, M. Stoutamire, D., and Wadler, P., Making the Future Safe for the Past: Adding Genericity to the Java™ Programming Language, published at least by Apr., 1998.

Myers, A., Bank, J.A., and Liskov, B., "Parameterized Types of Java", published at least by Jan., 1997.

Odersky, M. and Wadler, P., "Leftover Curry and Reheated Pizza: How Functional Programming Nourishes Software Reuse", published at least by Jun., 1998.

Odersky, M. and Wadler, P., "Pizza into Java: Translating Theory into Practice," published at least by Jan., 1997.

Bruce, Kim. B., Petersen, Leaf and Fiech, Adrian, "Subtyping is Not a Good "Match" for Object–Oriented Languages," published at least by Jun., 1997.

Agesen, Ole, Freund, Stephen N. and Mitchell, John C., "Adding Type Parameterization to the Java Language," published at least by Oct., 1997.

Laufer et al, "Polymorphic Type Inference and Abstract Data Types," ACM Transactions on Programming Languages and Systems, vol. 16, No. 5, pp. 1411–1430, Sep. 1994.

(List continued on next page.)

*Primary Examiner*—Tariq R. Hafiz
*Assistant Examiner*—Tuan Q. Dam
*Attorney, Agent, or Firm*—McDermott, Will & Emery

[57] ABSTRACT

A method and apparatus for generating code using parameterized classes which is compatible with an existing class library that was previously generated using unparameterized classes is disclosed. According to the method, parameterized source code is received that contains variables that belong to a plurality of types which are defined by supplying parameter values to a parameterized class definition. Static type checking is performed on the parameterized source code to determine if any incompatible type assignments exist between variables that belong to the plurality of types and values assigned to the variables. If no incompatible type assignments exist, then a homogeneous translation is performed on the parameterized source code to generate unparameterized class code. The unparameterized class code is then compiled to produce code that is compatible with the existing class library that was generated using unparameterized classes.

18 Claims, 4 Drawing Sheets

OTHER PUBLICATIONS

Kim B. Bruce, "Safe type checking in statically–typed object–oriented programming language," POPL '93, ACM 20th symposium on Principles of programming languages, pp. 285–298, Jan. 1993.

Chen et al, Parametric Type Classes, LFP '92, ACM SIGPLAN Lisp Pointers, Proceedings of the conference on Lisp and functional programming, vol. V, No. 1, pp. 170–181, Jan. 1992.

Philip Wadler, "GJ, Pizza, and Java," http.//www.cs.bell–labs.com/who/wadler/topics/gj.html, pp. 1–4, U–known.

Philip Wadler, "A Generic Java Language Extension," http:www.cs.bell–labs.com/who/wadler/pizza/gj/, pp. 1–2, U–Known.

METHOD OF IMPLEMENTING PARAMETERIZED TYPES TO BE COMPATIBLE WITH EXISTING UNPARAMETERIZED LIBRARIES

FIELD OF THE INVENTION

The present invention relates to computer software, and more specifically to the parameterization of types.

BACKGROUND OF THE INVENTION

In recent years, object-oriented programming has become the standard programming paradigm. In object oriented programming, the world is modeled in terms of objects. An object is a record combined with the procedures and functions that manipulate it.

The behavior of objects is specified by classes, which are like "data types" of traditional programming languages, but serve additionally to classify objects into hierarchies through an inheritance mechanism, as described in such languages as the Java™ programming language. The classes serve as templates from which objects can be created. All objects in a class have the same fields ("attributes"), and are manipulated by the same procedures and functions ("methods"). An object is said to be an "instance" of the class to which it belongs.

The attributes of an object may themselves be objects, and therefore belong to their own classes. Under various circumstances, it is desirable to have objects that differ from each other only in the classes to which their attributes belong. For example, it may be necessary for a particular application to have a vector of strings, a vector of characters, and a vector of vectors of strings. In each of these cases, the vectors differ only in the type of elements stored in the vectors.

One solution is to define a separate class definition for each of the attribute types. For example, a vector class can be defined for vectors having attributes belonging to the class of Characters, another vector class can be defined for vectors having attributes belonging to the class of Strings, and still another vector class can be defined for vectors having attributes belonging to the class of Vectors of Strings.

The following code example uses the Java™ programming language to define a type-specific Vector class having attributes belonging to the class of Character.

TYPE-SPECIFIC CLASS

```
10  class CharacterVector {
12      public static final int CAPACITY = 4;
14      private Character [] oa = new Character[CAPACITY];
18      public Character get (int i) {
20          if(0 <= i && i < CAPACITY) return oa[i];
22          else throw new IndexOutOfBoundsException();
24      }
26      public void set (int i, Character val) {
28          if(0 <= i && i < CAPACITY) oa[i] = val;
30          else throw new IndexOutOfBoundsException();
32      }
34  }
```

In this example, the class Vector includes two attributes (CAPACITY and oa) and two methods (get and set). The oa attribute is defined at line 14 as an array of elements that are of type "Character". The CAPACITY attribute is an int constant that defines the minimum storage capacity of the array oa. In the example, the array oa is initially allocated to store no less than four elements (Characters).

The get method, defined in lines 18–24, is called to get the ith element from the oa vector. The get method takes an input parameter "i" that is of type int and returns a value that is of type Character. At line 20, if the index value "i" is within range, the Character at location "i" of array oa is returned. The set method, defined in lines 26–32, takes input parameter "i" that is of type int and input parameter val that is of type Character. The set method is called to set the ith element in the oa vector to the Character as defined by the parameter val. In both methods, if the index value "i" is not within range, an out-of-bounds exception is thrown (IndexOutOfBoundsException).

Alternatively, a type-specific Vector class having attributes belonging to the class of String, can be defined using the Java programming language as follows:

TYPE-SPECIFIC CLASS

```
40  class StringVector {
42      public static final int CAPACITY = 4;
44      private String [] oa = new String[CAPACITY];
48      public String get (int i) {
50          if(0 <= i && i < CAPACITY) return oa[i];
52          else throw new IndexOutOfBoundsException();
54      }
56      public void set (int i, String val) {
58          if(0 <= i && i < CAPACITY) oa[i] = val;
60          else throw new IndexOutOfBoundsException();
62      }
64  }
```

In this example, the class Vector includes two attributes (CAPACITY and oa) and two methods (get and set). The oa attribute is defined at line 44 as an array of elements that are of type "String". The CAPACITY attribute is an int constant that defines the minimum size of oa. In this example, oa will hold at least four elements (Strings).

The get method, defined in lines 48–54, is called to get the ith element from the oa vector. The get method takes an input parameter "i" that is of type int and return a value that is of type String. At line 50, if the index value "i" is within range, the String at location "i" of array oa is returned. The set method, defined in lines 56–62, takes input parameter "i" that is of type int and input parameter val that is of type String. The set method is called to set the ith element in the oa vector to the String as defined by the parameter val. In both methods, if the index value "i" is not within range, an out-of-bounds exception routine is called (IndexOutOfBoundsException).

A draw back of defining a type-specific class for each attribute type (i.e. Character, String, etc.), is that memory must be allocated for each type-specific class definition. Allocating space for each type-specific class is both wasteful and inefficient as memory is consumed by redundant code.

One approach to reducing the redundancy caused by the allocation of memory for each type-specific class definition is to have a class definition that is generic. A generic class definition specifies one or more attributes to be of the generic object class. Because all classes descend from the generic object class, the programmer is free to store type-specific classes as generic-type object classes. For example, a Vector class may be defined having attributes of type "Object". By defining the generic Vector class as having attributes of type Object, a single class definition can be used for processing multiple attribute types (i.e. Character, String, etc.).

The following code example, using the Java™ programming language, defines a generic Vector class having attributes that belong to the class of Object.

| GENERIC-TYPE VECTOR CLASS (UNPARAMETERIZED) |
|---|
| 70 class Vector { |
| 72    public static final int CAPACITY = 4; |
| 74    private Object [] oa = new Object [CAPACITY]; |
| 78    public Object get (int i) { |
| 80      if(0 <= i && i < CAPACITY) return oa[i]; |
| 82       else throw new IndexOutOfBoundsException(); |
| 84    } |
| 86    public void set (int i, Object val) { |
| 88      if(0 <= i && i < CAPACITY) oa[i] = val; |
| 90    else throw new IndexOutOfBoundsException(); |
| 92    } |
| 94 } |

In this example, the class Vector includes two attributes (CAPACITY and oa) and two methods (get and set). The oa attribute is defined at line 74 as an array of elements that are of type "Object". The CAPACITY attribute, is an int constant that defines the minimum number of elements (Objects) for which space will be allocated in the array oa.

The get method, defined in lines 78–84, is called to get the ith element from the oa vector. The get method takes an input parameter "i" that is of type int and returns a value that is of type Object. At line 80, if the index value "i" is within range, the Object at location "i" of array oa is returned. The set method, defined in lines 86–92, takes input parameter "i" that is of type int and input parameter val that is of type Object. The set method is called to set the ith element in the oa vector to the Object as defined by the parameter val. In both methods, if the index value "i" is not within range, an out-of-bounds exception is thrown (IndexOutOfBoundsException).

Because the Vector definition specifies elements of a generic type (i.e. type Object), vectors having different attribute types (i.e. Character, String, etc.), can be instantiated from the single class definition.

For example, using the Vector class definition as defined above in lines 70–94, the following line of user program code may be used to instantiate a vector having attributes of type Object.

| USER PROGRAM CODE (UNPARAMETERIZED) |
|---|
| 100 Vector iv = new Vector();    // CREATE A VECTOR OF OBJECTS |

As depicted in line 100, when a new vector is needed, a vector of type object (iv) is instantiated by requesting a new vector (iv). Because the instantiated vector "iv" has elements of type Object, it may contain elements of any object class that is a descendant of type Object. Since type Object is the generic object class from which all other object types descend, the vector iv may contain elements of any object class (i.e. Character, String, etc.). Therefore, a single vector class definition having elements of type Object may be used to instantiate vectors having elements of different element types (i.e. Character, String, etc.). This provides for a reduction in memory allocation, since a single class definition may be used to implement vector objects that store numerous types of elements.

A draw back associated with defining a generic vector type in this manner is that the programmer is forced to keep track of the type of element that is stored in each vector, and must use an appropriate, explicit "cast" in extracting an element from a particular vector. A cast is a mechanism that is used to explicitly convert a less specific type to a more specific type (e.g. a variable of type "Object" to a variable of type Character). For example, using the Java™ programming language, a fragment of user program code that makes use of the vector class defined in lines 70–94, may be as follows:

| UNPARAMETERIZED USER PROGRAM SOURCE CODE |
|---|
| 102 Vector cv = new Vector(); |
| 104 cv.set(0, new Character ('a')); |
| 106 cv.set(1, new Character ('b')); |
| 108 Character c = (Character)cv.get(0); |
| 110 Vector sv1 = new Vector(); |
| 112 sv1.set(0, "zero"); |
| 114 sv1.set(1, "one"); |
| 116 String s = (String)sv1.get(0); |
| 118 Vector sv2 = new Vector(); |
| 120 sv2.set(0, "one"); |
| 122 String s2 = (String)sv2.get(0); |
| 124 Character i2 = (Character)sv1.get(0); // RUN_TIME ERROR |

The execution of this user program code example provides the following results. At lines 102, 110 and 118, vectors having attributes of type Object are instantiated as vectors cv, sv1 and sv2 respectively. At line 104 the element at location 0 of vector cv is set equal to the Character "a" and at line 106 the element at location 1 of vector cv is set equal to the Character "b". At line 108, a Character variable c is set equal to the element at location 0 in vector cv. As depicted, an appropriate cast must be used to explicitly convert from a less specific type to a more specific type (e.g. from a variable of type Object to a variable of type Character).

At line 112 the element at location 0 of vector sv1 is set equal to the String "zero" and at line 114 the element at location 1 of vector sv1 is set equal to the String "one". At line 116, a string variable s is set equal to the element at location 0 in vector sv1. Here again, an appropriate cast must be used to explicitly convert from a less specific type to a more specific type (e.g. from a variable of type Object to a variable of type String).

At line 120 the element at location 0 of vector sv2 is set equal to the String "one" and at line 122, a string variable s2 is set equal to the element at location 0 in vector sv2 using the appropriate cast.

As depicted in line 124, a drawback associated with using a generic-type vector class is that a run-time error occurs if an attempt is made to cast a vector element into an "incompatible" variable type (i.e. an attempt is made to cast a vector element of type String (element at location 0 of vector sv1) into a variable of type Character (c2)).

In certain languages, such as the Java™ programming language, the programmers themselves are required to insert the casts since the languages are statically type safe, thereby restricting the compiler from inserting appropriate casts at compile time. Thus, using a generic-type class as depicted in lines 70–94, a substantial burden is imposed on the programmer to correctly cast each element of type Object to its correct type in order to avoid introducing incompatible type assignment errors that typically cannot be caught at compile time. In addition, by requiring the use of casts, additional runtime overhead is introduced as the execution of typecasting instructions requires the use of extra computing cycles.

One approach to avoiding the substantial burden imposed on programmers by casting is through the use of parameterized classes. A parameterized class is a class in which the element type of the class is defined by a parameter. Class definitions that provide a type parameter list are referred to herein as parameterized classes. Because the type of parameter is specified in the code that uses the parameterized class, incompatible assignments and type casts can be detected at compile time in the context of the code that uses the parameterized class.

For example, a parameterized class alternative to the vector class definition previously described above (lines 70–94) may be defined as follows:

---
PARAMETERIZED CLASS LIBRARY SOURCE CODE
---

```
130 class Vector<A>{
132   public static final int CAPACITY = 4;
134   private A [] oa = new A [CAPACITY];
138   public A get (int i) {
140     if(0 <= i && i < CAPACITY) return oa[i];
142       else throw new IndexOutOfBoundsException();
144   }
146   public void set (int i, A val) {
148     if(0 <= i && i < CAPACITY) oa[i] = val;
150       else throw new IndexOutOfBoundsException();
152   }
154 }
```

In this example, the class Vector includes a parameter "A", two attributes (CAPACITY and oa) and two methods (get and set). The oa attribute is defined at line 134 as an array of elements that are of type "A". The CAPACITY attribute is an int constant that defines the number of elements (Objects) for which storage is allocated in the array oa.

The get method, defined in lines 138–144, is called to get the ith element from the oa vector. The get method takes an input parameter "i" that is of type int and returns a value that is of type A. At line 140, if the index value "i" is within range, the element at location "i" of array oa is returned. The set method, defined in lines 146–152, takes input parameter "i" that is of type int and input parameter val that is of type A. The set method is called to set the ith element in the oa vector to the parameter val, which has been defined as being of type A. In both methods, if the index value "i" is not within range, an out-of-bounds exception is thrown (IndexOutOfBoundsException).

By parameterizing the vector class definition, a single class definition can be used to instantiate vectors having elements of different attribute types (i.e. Character, String, etc.). In addition, by using a parameterized vector class definition, the type of element that is contained in each vector instance can be identified at compile time. This allows for static type-checking and the identification of incompatible type assignments during compilation, without the need of explicit type casts.

For example, using the Java™ programming language, the compilation of a fragment of user program code that is linked to the above parameterized vector class (lines 130–154), may be as follows.

---
PARAMETERIZED USER PROGRAM SOURCE CODE
---

```
160 Vector<Character> cv =
      new Vector<Character> ();    // CREATE VECTOR OF
                                      CHARACTERS
162 cv.set(0, '1');
164 cv.set(2, '5');
166 Character c = cv.get(0);       // NO CAST REQUIRED
```

---
PARAMETERIZED USER PROGRAM SOURCE CODE
---

```
168 Vector<String> sv1 =
      new Vector<String> ();       // CREATE 1st VECTOR OF STRINGS
170 sv1.set(0, "zero");
172 sv1.set(1, "one");
174 String s = sv1.get(0);         // NO CAST REQUIRED
176 Vector <String> sv2 =
      new Vector <String> ();      // CREATE 2nd VECTOR OF STRINGS
178 sv2.set(0, "one");
180 String s2 = sv2.get(0);        // NO CAST REQUIRED
182 Character c2 = sv1.get(0);     // COMPILE-TIME ERROR
```

The execution of this parameterized class code example provides the following results. At line 160, a vector (cv) having elements of type Character is instantiated. Specifically, the "character" parameter passed when the vector constructor (the "new" method) is invoked in line 160 causes the creation of a new vector in which the attribute "oa" is an array of Character. Similarly, at lines 168 and 176 vectors (sv1 and sv2) having elements of type String are instantiated by invoking the vector constructor and passing "String" as the parameter value.

At line 162, the element at location 0 of vector cv is set equal to the Character "1" and at line 164 the element at location 2 of vector cv is set equal to the Character "5". At line 166, a Character variable c is set equal to the element at location 0 in vector cv. Because vector cv was previously instantiated as having attributes of type Character (line 160), the compiler is able to determine whether vector cv contains attributes that are compatible with the Character variable c. Therefore, a cast instruction is no longer required to explicitly convert from a less specific type to a more specific type.

At line 170, the element at location 0 of vector sv1 is set equal to the String "zero" and at line 172, the element at location 1 of vector sv1 is set equal to the String "one". At line 174, the element at location 0 in vector sv1 is assigned to a String variable s. Here again, because vector sv1 was previously instantiated as having attributes of type String (line 168), the compiler is able to determine whether vector sv1 contains attributes that are compatible with the String variable s. Additionally, a cast instruction is not required to explicitly convert from a less specific type to a more specific type.

At line 178 the element at location 0 of vector sv2 is set equal to the String "one" and at line 180, a string variable s2 is set equal to the element (String) at location 0 in vector sv2, without the use of a cast instruction.

At line 182, an attempt is made to assign an element of a vector (sv1) that is of type String, to a variable (c2) that is of type Character. By including a parameter with each vector instantiation (as required by the class definition in lines 130–154), the compiler can determine without an explicit type cast, the element type of each vector instance. In knowing the type of element that is associated with a particular vector instance, the compiler can perform static type-checking to determine whether a variable type is compatible with the element type contained by the particular vector instance.

For example, by including the parameter "Character" in the instantiation of the vector cv at line 160, the compiler knows from that point forward that the elements of the vector cv are of type Character. This allows the compiler to perform static type-checking on all assignments involving elements of the vector cv. Thus, static type-checking provides the benefit of being able to identify incompatible type assignments at compile time, rather than at runtime. For example, the benefit of using static type checking is illustrated by line 182 where an attempt is made to assign an element of the vector sv1, that has been previously defined (instantiated) as type String (line 168), to a variable "c2", that is of type Character.

Because incompatible type assignment errors can be caught at compile time, the use of parameterized classes can significantly reduce the number of runtime errors caused by incompatible type casts. In addition, because the assigned element type for a particular class instance can be determined at compile time, the programmer is no longer required to write code that casts when extracting an element from a particular class instance.

Although parameterized class types provide the added benefit of allowing static type checking, an enormous amount of library code has been developed and installed that pre-dates the use of parameterized class types (i.e. created using unparameterized library code). Thus, a large investment, in terms of dollars and manpower has been made in developing unparameterized library code. In certain cases, the unparameterized library code has been distributed and is in use throughout the world. For example, an enormous amount of class code has been developed using the Java™ programming language that pre-dates the use of parameterized class types. This unparameterized class code has been compiled into class library byte code which has been distributed, and is currently in use, throughout the world.

As shown above, unparameterized class code has the disadvantage that it does not allow a compiler to perform static type-checking and requires the programmer to insert explicit type-casting instructions into the unparameterized user program source code. Thus, much of the existing unparameterized class libraries would have been easier to interface and develop class code with if parameterization had been available when class libraries were first developed.

One approach to generating "new" user program byte code, while still taking advantage of parameterized classes, is to convert parameterized code to unparameterized code using a heterogeneous translation. A heterogeneous translation is a translation that causes a different class to be generated for every parameter value used with the parameterized class. The heterogeneous translation method is in common use by such languages as C++, in which a form of macro expansion is used to create an instance of a new class type for each class type parameter.

For example, performing a heterogeneous translation on the parameterized class code previously shown in lines 130–154 and 160–182, the following classes will be generated for the different class parameter values (i.e. Character and String).

```
200 class VectorCharacter {
202 public static final int CAPACITY = 4;
204 private Character [] oa = new Character[CAPACITY];
208 public Character get (int i) {
210    if (0 <= i && i < CAPACITY) return oa[i];
212      else throw new IndexOutOfBoundsException();
214 }
216 public void set (int i, Character val) {
218    if(0<= i && i < CAPACITY) oa[i] = val;
220      else throw new IndexOutOfBoundsException();
222 }
224 }
230 class VectorString {
```

-continued

```
232 public static final int CAPACITY = 4;
234 private String [] oa = new String[CAPACITY];
238 public String get (int i) {
240    if (0 <= i && i < CAPACITY) return oa[i];
242      else throw new IndexOutOfBoundsException();
244 }
246 public void set (int i, String val) {
248    if(0 <= i && i < CAPACITY) oa[i] = val;
250      else throw new IndexOutOfBoundsException();
252 }
254 }
```

FIG. 1 illustrates a block diagram in which the heterogeneous translation is used to generate "new" class files while taking advantage of parameterized class code. FIG. 1 is described in terms of the previous Vector class code examples. As depicted in FIG. 1, class files 102 consists of unparameterized user program byte code 106 and unparameterized class library byte code 104. The unparameterized class library byte code 104 was generated by compiling 110 unparameterized class library source code 116 (code lines 70–94) to produce a Vector of Object. The unparameterized user program byte code 106 was generated by compiling 108 unparameterized user program source code 112 (code lines 102–124) with unparameterized class definitions 114 and is used to invoke methods in the Vector of Object. The unparameterized class definitions 114 provide compile time interface definitions for interfacing the unparameterized user program source code 112 with the unparameterized class library byte code 104. As depicted by double arrow 130, the unparameterized user program byte code 106 is compatible with and therefore can interface with the unparameterized class library byte code 104.

Parameterized user program source code 126 represents program code (code lines 160–182) which was developed with the use of parameters (Character and String). Parameterized class definition 128 provides interface definitions for interfacing the parameterized user program source code 126 with unparameterized class library byte code 104. In generating user program byte code 118, static type-checking 124 is performed on the parameterized user program source code 126 and parameterized class definitions 128. As previously discussed, static type checking is performed on the parameterized source code to determine if the code contains any incompatible type assignments. After the static checking 124 is performed, a heterogeneous translation 122 is performed to create a class instance for each class type parameter used in the parameterized user program source code 126 (i.e. line 200–224 and 230–254). Thus, referring to the previous code examples, all vector instances having elements of type "Object" are translated into vector instances having elements of the particular class type parameter. For example, the code at line 160 above using the heterogeneous translation method, will create an instance of a vector of type Character (lines 200–224) and the code at line 168 and 176, will create an instance of a vector of type String (lines 230–254). The output from the heterogeneous translation 122 is then compiled 120 into user program byte code 118, which invokes methods of Vector of Character and Vector of String.

A drawback associated with using the heterogeneous translation method to generate user program byte code is that the byte code created from the parameterized types is of a different form than the byte code that was originally generated using the unparameterized class libraries. Specifically, using the heterogeneous translation method, the newly created byte code contains additional references to classes for each element type as specified by each parameter type (i.e. Character, String). However, the byte code that is compiled from the unparameterized class files do not contain these additional class references. These additional references cause the byte code that is created from the parameterized class files to be incompatible with byte code that was produced from unparameterized class files on existing systems that are currently in use. These systems that execute byte code are generally termed "code executors".

For example, an enormous investment has been made in the development of code executors such as the Java Virtual Machines (JVMs). The JVMs interpret the byte code to create objects which are instances of the classes defined by the class definitions. These objects control the execution of the JVMs. JVMs are described in detail in *The Java Virtual Machine Specification* (1996), authored by Tim Lindholm & Frank Yellin. Because the JVMs expect the byte code to contain classes of a particular type (e.g. Object), the byte code produced using the heterogeneous translation method is incompatible and can not be correctly interpreted by the JVMs. Thus, these JVMs cannot take advantage of parameterizing the unparameterized class libraries using the heterogeneous translation method.

Based on the foregoing, it is highly desirable to develop a mechanism that provides for the benefits of using parameterized code (e.g. catching errors at compile time, avoiding the need for explicit type casting) but still allows for the use of old unparameterized class libraries and old virtual machines that don't support parameterized code.

SUMMARY OF THE INVENTION

The present invention provides a method and apparatus for generating code using parameterized classes, that is compatible with an existing class library which was previously generated using unparameterized classes.

According to the method, parameterized source code is received that contains variable that belong to a plurality of types which are defined by supplying parameter values to a parameterized class definition. Static type checking is performed on the parameterized source code to determine if any incompatible type assignments exist between variables that belong to the plurality of types and values assigned to the variables. If no incompatible type assignments exist, then a homogeneous translation is performed on the parameterized source code to generate unparameterized class code. The unparameterized class code is then compiled to produce code that is compatible with the existing class library that was generated using unparameterized classes.

According to another aspect of the invention, in performing the homogeneous translation on the parameterized source code, an erasure type, for which all parameter values can be members, is determined. The parameter values are then replaced by the erasure type.

According to another aspect of the invention, one or more flags are added to the code which can be used to identify the code as being created using parameterized classes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for implementing parameterized class types to be compatible with existing unparameterized libraries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 2:
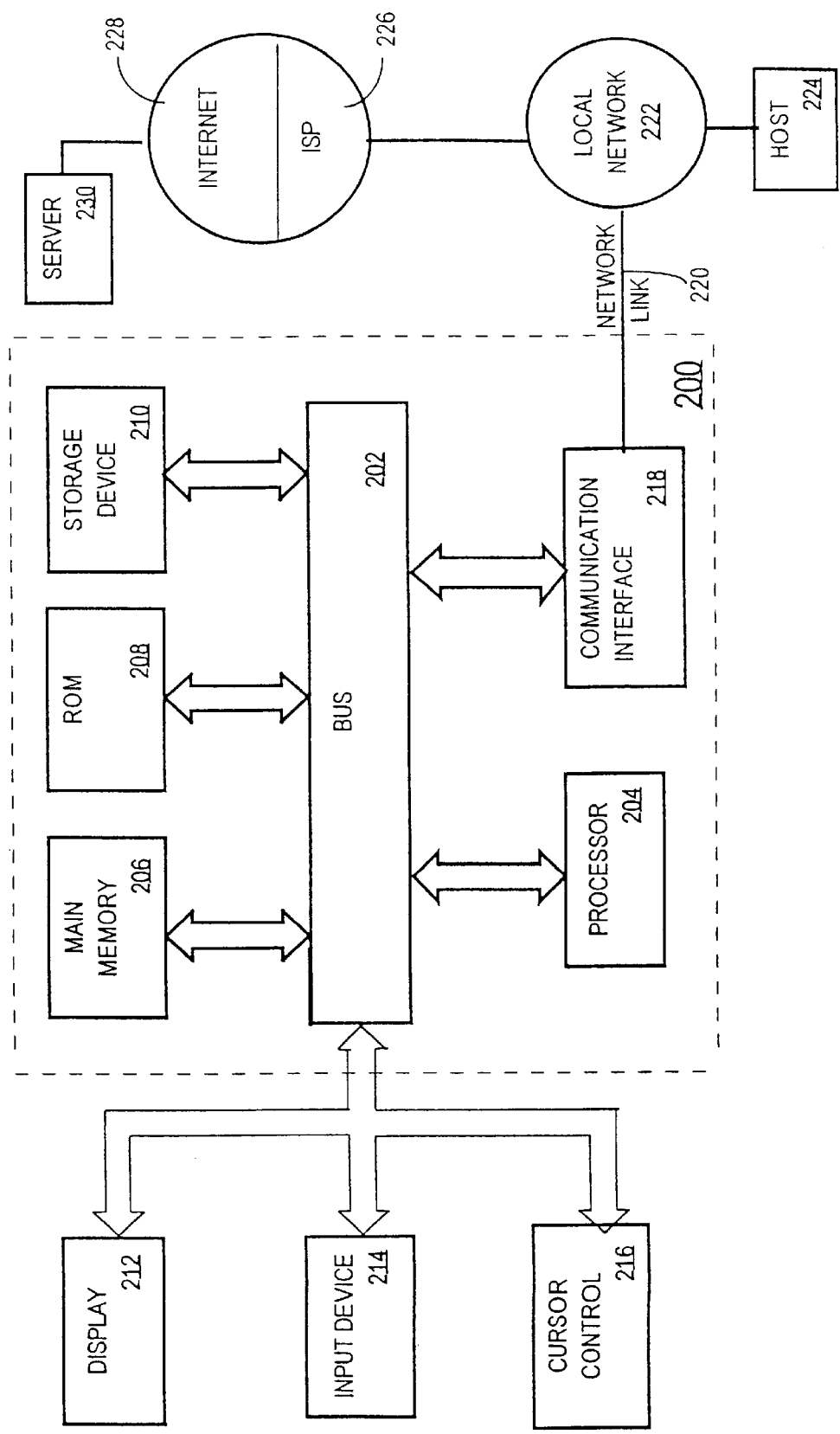
FIG. 2 is a block diagram of a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device' is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing parameterized class types to be compatible with existing unparameterized libraries. According to one embodiment of the invention, the implementing of parameterized class types to be compatible with existing unparameterized libraries, is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for implementing parameterized class types to be compatible with existing unparameterized libraries as described herein.

The received code may be executed by processor 204 as it is received, and/or stored in storage device 210, or other non-volatile storage for later execution. In this manner, computer system 200 may obtain application code in the form of a carrier wave.

Homogenous Translation

In one embodiment of the invention, a homogeneous translation technique is used to generate byte code from parameterized class files. The code thus produced is effectively identical, from the perspective of the code executors, to byte code that is produced using unparameterized class libraries. Homogeneous translation differs from heterogeneous translation in that a single parameterized class is translated into a single generic class, rather than into multiple type-specific classes. For example, the generic type of Object can be substituted for the types of Character and String, since both the type of Character and the type of String depend from the single type of Object.

The generic type that is substituted for each class type is termed the "erasure". The erasure represents a generic type for which all classes can be members. For example, the classes Vector of Character and Vector of String can be represented by the class Vector of Object. In one embodiment, the erasure is of type Object and performing the homogeneous translation causes each parameterized class type to be replaced with a class of type Object.

For example, using a parameterized class definition of vectors, some vectors may contain elements of type Character, and other vectors may contain elements of type String. If the erasure is of type Object, performing the homogenous translation causes a single vector class instance to be created, where the vector elements are of type Object. This single generic vector class provides a class type for which all possible class types can be members (i.e. Character and String in this example). By performing the homogeneous translation technique on the parameterized class code previously shown in lines 130–154 and 160–182, the following generic class will be generated from the different class parameter types (i.e. Character and String).

```
260 class Vector {
262   public static final int CAPACITY = 4;
264   private Object [] oa = new Object [CAPACITY];
268   public Object get (int i) {
270     if(0 <= i && i < CAPACITY) return oa[i];
272     else throw new IndexOutOfBoundsException();
274   }
276   public void set (int i, Object val) {
```

-continued

```
278     if (0 <= i && i < CAPACITY) oa[i] = val;
280     else throw new IndexOutOfBoundsException();
282   }
284 }
290 Vector cv = new Vector();
292 cv.set(0, new Character('a'));
294 cv.set(1, new Character('b'));
296 Character c = (Character)cv.get(0);
298 Vector sv1 = new Vector();
300 sv1.set(0, "zero");
302 sv1.set(1, "one");
304 String s = (String)sv1.get(0);
306 Vector sv2 = new Vector();
308 sv2.set(0, "one");
310 String s2 = (String)sv2.get(0);
312 Character c2 = (Character)sv1.get(0);
```

Figure 1:
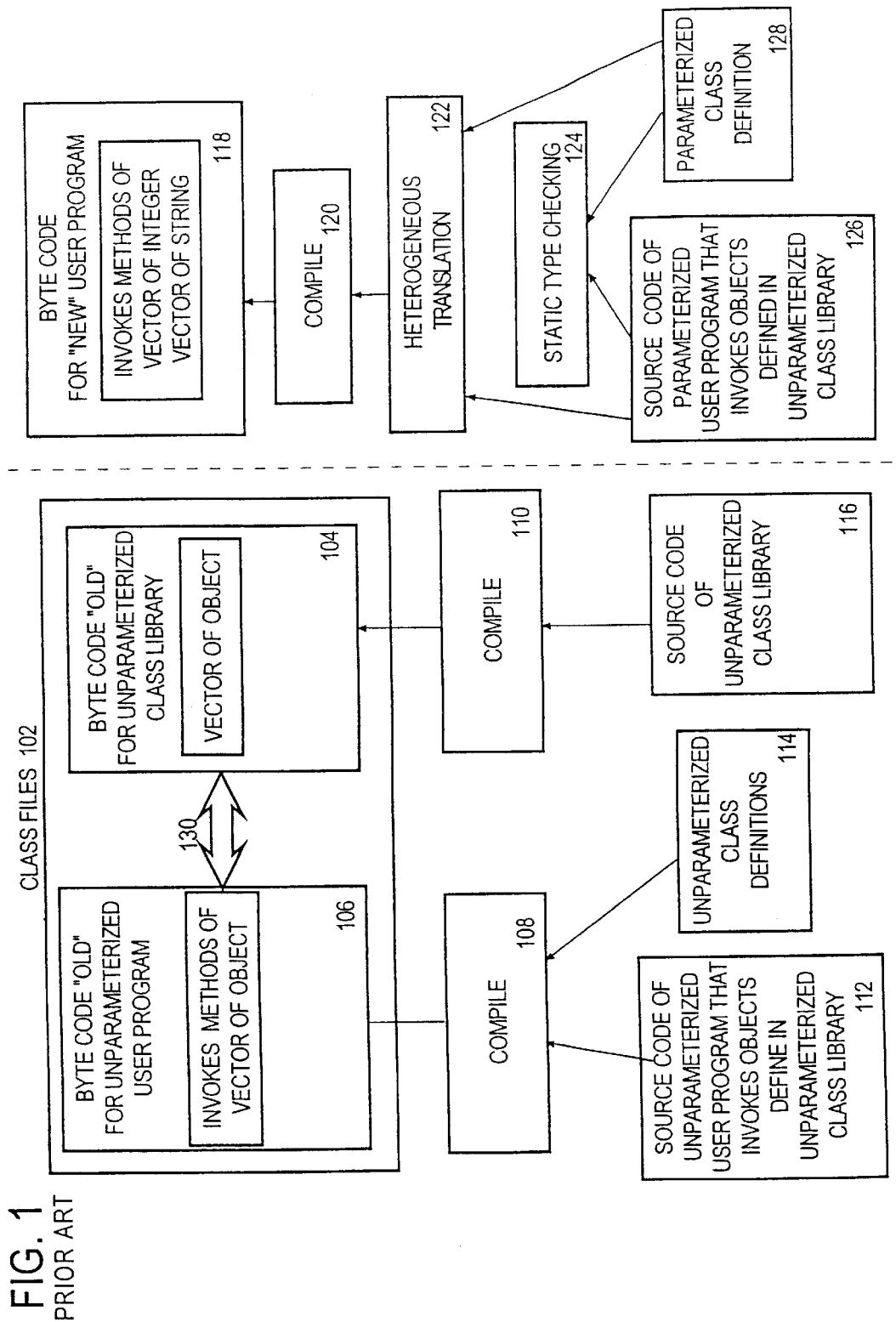
FIG. 1 is a block diagram for implementing parameterized types using a heterogeneous method of translation as used in the prior art.
Figure 3:
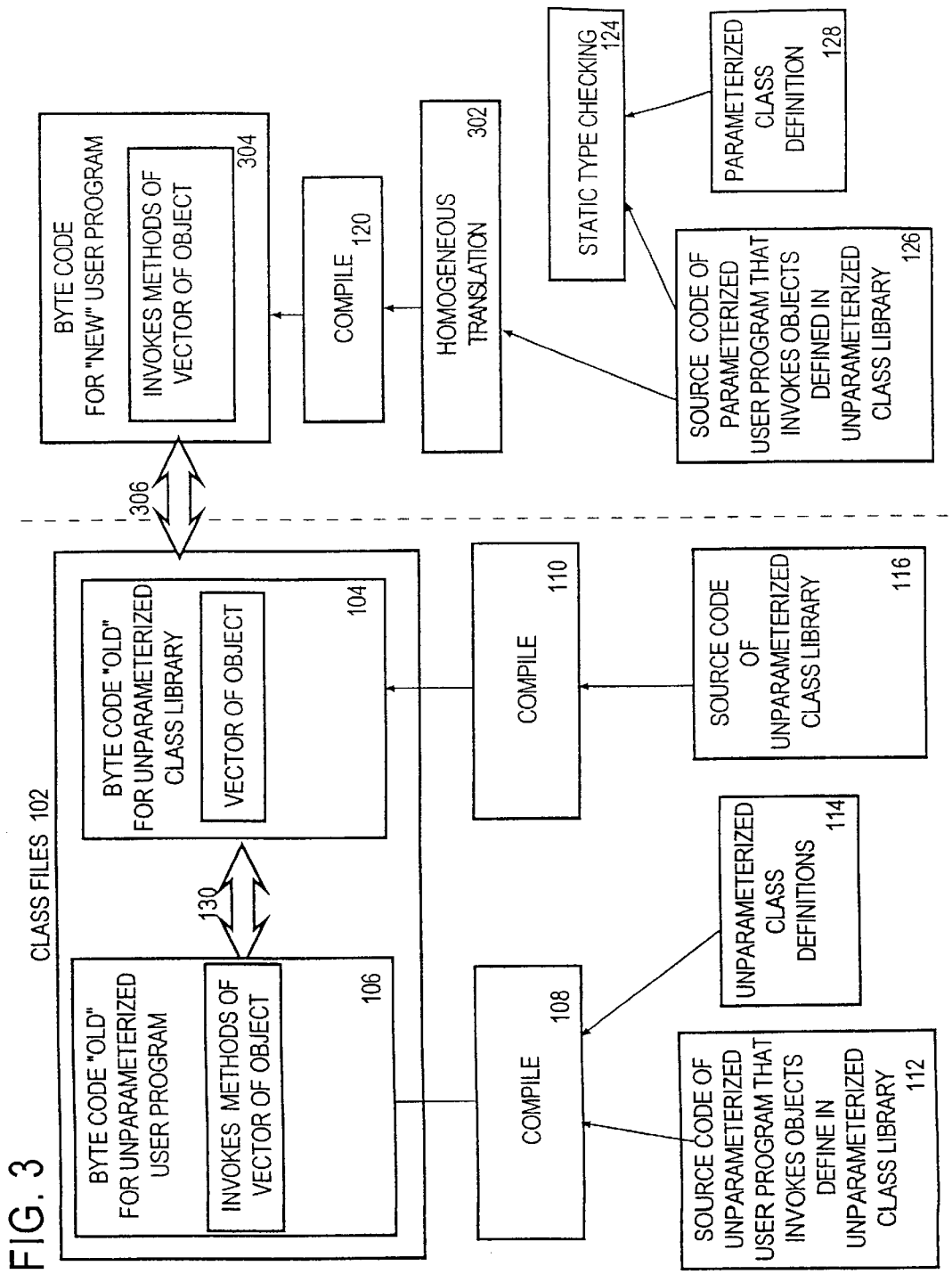
FIG. 3 is a block diagram for implementing parameterized types using a homogeneous method of translation.

FIG. 3 illustrates a block diagram in which the homogeneous translation technique uses parameterized classes to generate "new" user program byte code that is effectively identical to byte code that is produced from unparameterized class libraries. FIG. 3 is similar to FIG. 1, and therefore like components have been numbered alike.

FIG. 3 is described in terms of the previous Vector class code examples. In this example, the homogenous translation is explained with references to the previously described code. As depicted in FIG. 3, class files 102 consist of unparameterized user program byte code 106 and unparameterized class library byte code 104. The unparameterized class library byte code 104 was generated by compiling 110 unparameterized class library source code 116 (code lines 70–94) to produce a Vector of Object. The unparameterized user program byte code 106 was generated by compiling 108 unparameterized user program source code 112 (code lines 102–124) with unparameterized class definitions 114 and is used to invoke methods in the Vector of Object. The unparameterized class definitions 114 provide compile time interface definitions for interfacing the unparameterized user program source code 112 with the unparameterized class library byte code 104. As depicted by double arrow 130, the unparameterized user program byte code 106 is compatible with and therefore can interface with the unparameterized class library byte code 104.

Parameterized user program source code 126 represents program code (code lines 160–182) which was developed with the use of parameters (Character and String). In generating "new" user program byte code 304, static type-checking 124 is performed on the parameterized user program source code 126 and parameterized class definitions 128 (code lines 130–154). As previously discussed, static type checking allows incompatible type assignments to be identified at "compile-time" rather than at run-time. After the static checking 124 is performed, a homogeneous translation 302 is performed to generate a generic class type for which all possible class types can be members (i.e. code lines (i.e. code lines 260–284). Thus, referring to code example (160–182), all vector instances having elements of type "Character" and of type "String" are translated into a vector instance having elements of type "Object". For example, in one embodiment, the code at line 160, 168 and 176 will translate into an instance of a vector of type "Object"(lines 70–94). The output from the homogeneous translation 302 is then compiled 120 into user program byte code 304, which invokes methods of Vector of Object. As indicated by double arrow 306, the "new" user program byte code 304 is compatible with and therefore can interface with the unparameterized class library byte code 104.

Figure 4:
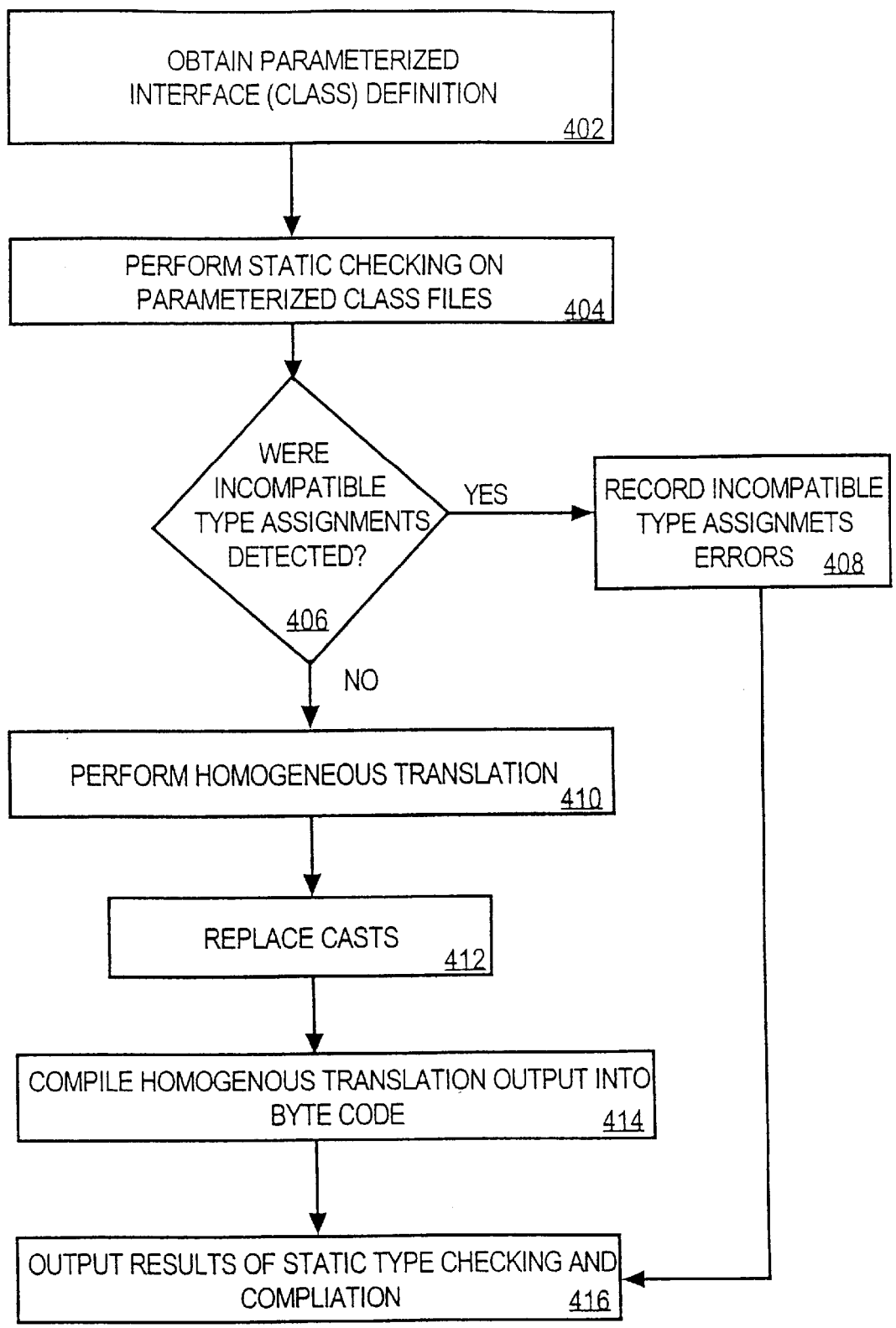
FIG. 4 is a flow diagram illustrating a method for implementing parameterized types using a homogeneous method of translation.

FIG. 4 illustrates a flow diagram that uses the homogeneous translation technique for implementing parameterized types to generate byte code that is effectively identical to byte code that is produced from unparameterized class libraries. At step 402, parameterized user program source code 126 is written without casts (lines 160–182). At step 404, static type checking is performed on the parameterized user program source code 126 and parameterized class definition 128 (lines 130–154), to determine if the code contains any incompatible type assignments. At step 406, it is determined whether any incompatible type assignments were detected while performing the static type checking. If incompatible type assignments were detected, then at step 408, the incompatible type assignments are recorded as compile time errors. Control then proceeds to step 416.

Otherwise, if at step 406 no incompatible type assignments were detected, then at step 410, the homogeneous translation method is performed to translate the parameterized user program source code and class definitions back to an unparameterized class file. To translate from parameterized class file code (130–154 and 160–182), back to an unparameterized class file (lines 260–284 and 290–312), each class type is replaced by its erasure. For example, referring to lines 130–154 and 160–182, if the erasure type is "Object", the erasure of the parametric type is obtained by deleting the parameter (i.e. "Vector<A>" erases to "Vector", "Vector<Character>" erases to "Vector", "Vector<String>" erases to "Vector"); the erasure of the non-parametric type is obtained be replacing the non-parametric type by itself (i.e. "Character" erases to "Character" and "String" erases to "String"); and the erasure of the type parameter is obtained by replacing the type parameter with the erasure type (i.e. "A" erases to "Object").

At step 412, casts are inserted around each method call where ever required, such as whenever the return type is a type parameter (i.e. "String s=sv.get(0)" is replaced by "String s=(String)sv.get(0)" and "Character c=cv.get(0)" is replaced by "Character c=(Character)cv.get(0)"). This produces the class file code shown in lines 260–284 and 290–312.

At step 414, the output from the homogeneous translation (lines 260–284 and 290–312), is compiled into "new" user program byte code 304 that is effectively identical to the "old" user program byte code 106 that was generated using unparameterized user program source code 112 and unparameterized class definitions 114. At step 416, the translation and compilation results are reported to the user.

Executing Byte Code on Older Virtual Machines

Because the output from the homogeneous translation is compiled into byte code that is effectively identical to the byte code that is generated from unparameterized libraries, older virtual machines without parameterized class files can execute byte code that is compiled, but not distributed with parameterized class files. Additionally, because static type checking is performed on the parameterized class files, the user is guaranteed that "incompatible" type runtime errors will not occur during execution of the compiled byte code on older VMs. Thus, the benefit of static type checking can be obtained while still generating byte code that is compatible with older code executors.

Executing Byte Code on Modified Virtual Machines

By adding certain annotations or flags to the byte code, which can be ignored by the older VMs, modified VMs can take further advantage of performing static type checking on parameterized class files by ignoring the cast instructions.

As previously stated, by using parameterized class files, static type checking can be performed to identify incompatible type assignments at compile time. Because the static type checking guarantees that incompatible runtime errors will not occur, the modified virtual machines are not required to perform casts when extracting elements of type object from a class instance. Therefore, in certain embodiments of the invention, flags are added to the byte code that indicate that the byte code was generated using parameterized class files. These annotations are used to reduce the overhead associated with executing casts, thus allowing the modified VMs to perform more efficiently.

SUMMARY

As described, the homogeneous translation technique can be used to generate byte code from parameterized source code that is effectively identical, in the view of the code executors, to byte code that is produced using unparameterized class libraries. Using the homogeneous method of translation, parameterized types can be used for statically type checking class files from unparameterized libraries, while still producing byte code that is effectively identical to the byte code that is generated from unparameterized libraries. Thus, the older virtual machines can continue to execute byte code that is compiled using parameterized class files.

Additionally, by including certain flags, modified VMs can further benefit from the static type checking by ignoring cast instructions as the user is guaranteed that "incompatible" type runtime errors will not occur during execution of the compiled byte code.

Although certain embodiments have been described using the Java™ programming language, the present invention can be practiced on a variety of programming languages, and as such should not be seen as limited to only the Java™ programming language.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating code using parameterized classes, such that the code is compatible with existing compiled code that was generated using unparameterized classes, the method comprising the steps of:

receiving parameterized source code that contains variables that belong to a plurality of classes which are defined by supplying parameter values to a parameterized class definition for one of said unparameterized classes defined in said existing compiled code;

performing static type checking on said parameterized source code to determine if incompatible type assignments exist between variables that belong to said plurality of classes and values assigned to said variables;

if no incompatible type assignments exist, then
      performing a homogeneous translation on the parameterized source code to generate unparameterized class code; and
      compiling the unparameterized class code to produce code that is compatible with the existing compiled code.

2. The method of claim 1, wherein the step of performing the homogeneous translation on the parameterized source code includes the steps of:

determining an erasure type for the parameter values, wherein the erasure type is of a generic type for which all parameter values can be members; and
   replacing the parameter values with the erasure type.

3. The method of claim 2, wherein the step of determining the erasure type for the parameterized types includes the step of setting the erasure type to be of type Object.

4. The method of claim 1, further comprising the step of adding one or more flags to the code, wherein the one or more flags can be used to identify the code as being created using parameterized classes.

5. The method of claim 4, further comprising the steps of:

executing the code on a code executor, wherein the code executor uses the one or more flags to determine that the code was created using parameterized classes; and
   the code executor, upon determining that the code was created using parameterized classes, ignoring cast instructions contained in the code, wherein the cast instructions are a result of the homogeneous translation.

6. The method of claim 2, further includes the step of adding cast instructions into the code; wherein the cast instructions are used to explicitly convert a less specific type to a more specific type.

7. A computer-readable medium carrying one or more sequences of instructions for generating code using parameterized classes, such that the code is compatible with existing compiled code that was generated using unparameterized classes, wherein execution of the one or more sequences of instructions by one or more processors causes the one or more processors to perform the steps of:

receiving parameterized source code that contains variables that belong to a plurality of classes which are defined by supplying parameter values to a parameterized class definition for one of said unparameterized classes defined in said existing compiled code;

performing static type checking on said parameterized source code to determine if incompatible type assignments exist between variables that belong to said plurality of classes and values assigned to said variables;

if no incompatible type assignments exist, then
      performing a homogeneous translation on the parameterized source code to generate unparameterized class code; and
      compiling the unparameterized class code to produce code that is compatible with the existing compiled code.

8. The computer-readable medium of claim 7, wherein the step of performing the homogeneous translation on the parameterized source code includes the steps of:

determining an erasure type for the parameter values, wherein the erasure type is of a generic type for which all parameter values can be members; and
   replacing the parameter values with the erasure type.

9. The computer-readable medium of claim 8, wherein the step of determining the erasure type for the parameterized types includes the step of setting the erasure type to be of type Object.

10. The computer-readable medium of claim 7, further comprising instructions for performing the step of adding one or more flags to the code, wherein the one or more flags can be used to identify the code as being created using parameterized classes.

11. The computer-readable medium of claim 10, further comprising instructions for performing the steps of:

executing the code on a code executor, wherein the code executor uses the one or more flags to determine that the code was created using parameterized classes; and the code executor, upon determining that the code was created using parameterized classes, ignoring cast instructions contained in the code, wherein the cast instructions are a result of the homogeneous translation.

12. The computer-readable medium of claim 8, further comprising instructions for performing the step of adding cast instructions into the code; wherein the cast instructions are used to explicitly convert a less specific type to a more specific type.

13. A system for generating code using parameterized classes, such that the code is compatible with existing compiled code that was generated using unparameterized classes, the system comprising:

a memory;

one or more processors coupled to the memory; and a set of computer instructions contained in the memory, the set of computer instructions including computer instructions which when executed by the one or more processors, cause the one or more processors to perform the steps of:

receiving parameterized source code that contains variables that belong to a plurality of classes which are defined by supplying parameter values to a parameterized class definition for one of said unparameterized classes defined in said existing compiled code;

performing static type checking on said parameterized source code to determine if incompatible type assignments exist between variables that belong to said plurality of classes and values assigned to said variables;

if no incompatible type assignments exist, then performing a homogeneous translation on the parameterized source code to generate unparameterized class code; and compiling the unparameterized class code to produce code that is compatible with the existing compiled code.

14. The system of claim 13, wherein the step of performing the homogeneous translation on the parameterized source code includes the steps of:

determining an erasure type for the parameter values, wherein the erasure type is of a generic type for which all parameter values can be members; and replacing the parameter values with the erasure type.

15. The system of claim 14, wherein the step of determining the erasure type for the parameterized types includes the step of setting the erasure type to be of type Object.

16. The system of claim 13, further comprising the step of adding one or more flags to the code, wherein the one or more flags can be used to identify the code as being created using parameterized classes.

17. The system of claim 16, further comprising the steps of:

executing the code on a code executor, wherein the code executor uses the one or more flags to determine that the code was created using parameterized classes; and the code executor, upon determining that the code was created using parameterized classes, ignoring cast instructions contained in the code, wherein the cast instructions are a result of the homogeneous translation.

18. The system of claim 14, further includes the step of adding cast instructions into the code; wherein the cast instructions are used to explicitly convert a less specific type to a more specific type.

* * * * *